US012091877B2

(12) United States Patent
Roberts

(10) Patent No.: US 12,091,877 B2
(45) Date of Patent: Sep. 17, 2024

(54) POOL PROTECTION SYSTEM

(71) Applicant: Lily Roberts, Watertown, CT (US)

(72) Inventor: Lily Roberts, Watertown, CT (US)

( * ) Notice: Subject to any disclaimer, the term of this patent is extended or adjusted under 35 U.S.C. 154(b) by 96 days.

(21) Appl. No.: 17/688,309

(22) Filed: Mar. 7, 2022

(65) Prior Publication Data

US 2023/0279682 A1 Sep. 7, 2023

(51) Int. Cl.
*E04H 4/06* (2006.01)
*B66D 1/74* (2006.01)

(52) U.S. Cl.
CPC ........... *E04H 4/065* (2013.01); *B66D 1/7447* (2013.01); *B66D 1/7489* (2013.01)

(58) Field of Classification Search
CPC ........ E04H 4/065
See application file for complete search history.

(56) References Cited

U.S. PATENT DOCUMENTS 3,046,566 A * 7/1962 Berman .................. E04H 4/065 4/504
3,052,893 A * 9/1962 McClure .................. E04H 4/08 52/126.5
5,025,512 A * 6/1991 Niimura .................. E04H 4/065 187/360
5,271,483 A * 12/1993 Hong .................. B66F 7/02 52/126.5
11,624,197 B1 * 4/2023 Mc Gill .................. E04H 4/065 4/495
2007/0220667 A1 * 9/2007 Kanetis .................. E04H 4/065 4/501
2009/0235446 A1 * 9/2009 Juracek .................. E04H 4/065 4/495
2012/0017365 A1 * 1/2012 Perrier .................. E04H 4/065 4/504
2023/0279682 A1 * 9/2023 Roberts .................. B66D 1/7489 4/495

OTHER PUBLICATIONS

VIDEO: "Pool Protector—Lily Roberts CT Invention Convention 2021", accessed at https://youtu.be/hEalXgHHYsk, Uploaded Mar. 22, 2021 (3 pages).

* cited by examiner

*Primary Examiner* — J C Jacyna
(74) *Attorney, Agent, or Firm* — Wilmer Cutler Pickering Hale and Dorr LLP

(57) ABSTRACT

Pool protection systems are disclosed. In one particular embodiment, a pool protection system may include a platform fitted in a pool, oriented substantially parallel to a surface of water in the pool, and configured to move vertically in the pool; one or more motors mechanically connected to the platform; and a controller in communication with the one or more motors.

15 Claims, 4 Drawing Sheets

POOL PROTECTION SYSTEM

FIELD OF THE DISCLOSURE

The present disclosure relates generally to pool protection systems and, more particularly, to pool protection systems that may be added to new or existing pools to prevent drownings.

BACKGROUND OF THE DISCLOSURE

According to the Consumer Product Safety Commission, there was an average of "379 reported pool-or-spa-related fatal drownings per year for 2015 through 2017, involving children younger than 15 years old," and "[r]esidential locations, such as a child's home, a family or friend's house or a neighbor's residence, made up 71 percent of the reported fatal drowning incidents." https://www.cpsc.gov/Newsroom/News-Releases/2020/New-CP SC-Report-Finds-Steady-Rise-in-Fatal-Child-Drownings.

In view of the foregoing, it may be understood that there is a need for a pool protection system that may be added to new or existing pools to prevent drownings.

SUMMARY OF THE DISCLOSURE

Pool protection systems are disclosed. In one particular embodiment, a pool protection system may include a platform fitted in a pool, oriented substantially parallel to a surface of water in the pool, and configured to move vertically in the pool; one or more motors mechanically connected to the platform; and a controller in communication with the one or more motors.

In accordance with other aspects of this particular embodiment, the controller may include a first mode, a second mode, and a third mode.

In accordance with other aspects of this particular embodiment, when the first mode is selected, the controller may be configured to activate the one or more motors to lower the platform in the pool; when the second mode is selected, the controller may be configured to deactivate the one or more motors; and when the third mode is selected, the controller may be configured to activate the one or more motors to raise the platform in the pool.

In accordance with other aspects of this particular embodiment, the controller may be an interface including three switches or buttons corresponding to the first mode, the second mode, and the third mode.

In accordance with other aspects of this particular embodiment, the controller may be a toggle switch or a lever having three positions corresponding to the first mode, the second mode, and the third mode.

In accordance with other aspects of this particular embodiment, the controller may be an electronic touch-sensitive user interface with three user interface elements corresponding to the first mode, the second mode, and the third mode.

In accordance with other aspects of this particular embodiment, the controller may be configured to deactivate the one or more motors when the platform reaches a maximum predetermined point of the pool.

In accordance with other aspects of this particular embodiment, the controller may be configured to deactivate the one or more motors when the platform reaches a minimum predetermined point of the pool.

In accordance with other aspects of this particular embodiment, the controller may include a protective mechanism to prevent unintended activation of the one or more motors.

In accordance with other aspects of this particular embodiment, the pool protection system may further include a plurality of cables. One end of each of the plurality of cables may be attached to the platform and at least one another end of each of the plurality of cables may be attached to a shaft of one of the one or more motors.

In accordance with other aspects of this particular embodiment, the pool protection system may include one motor for each of the plurality of cables.

In accordance with other aspects of this particular embodiment, the plurality of cables may be made of stainless steel or braided nylon.

In accordance with other aspects of this particular embodiment, the pool protection system may further include a plurality of pulley systems to support the plurality of cables between the platform and the one or more motors.

In accordance with other aspects of this particular embodiment, each of the plurality of pulley systems may include one or more pulleys to support the plurality of cables.

In accordance with other aspects of this particular embodiment, the pool protection system may include one motor.

In accordance with other aspects of this particular embodiment, a rotational motion of the one motor may be transferred around the pool via a plurality of shafts and a plurality of gearboxes.

In accordance with other aspects of this particular embodiment, the platform may include a plurality of openings.

In accordance with other aspects of this particular embodiment, the platform may be made of a material that is denser than water.

In accordance with other aspects of this particular embodiment, the platform may be made of aluminum, stainless steel, or polyethylene terephthalate.

In accordance with other aspects of this particular embodiment, the one or more motors may be electric motors.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
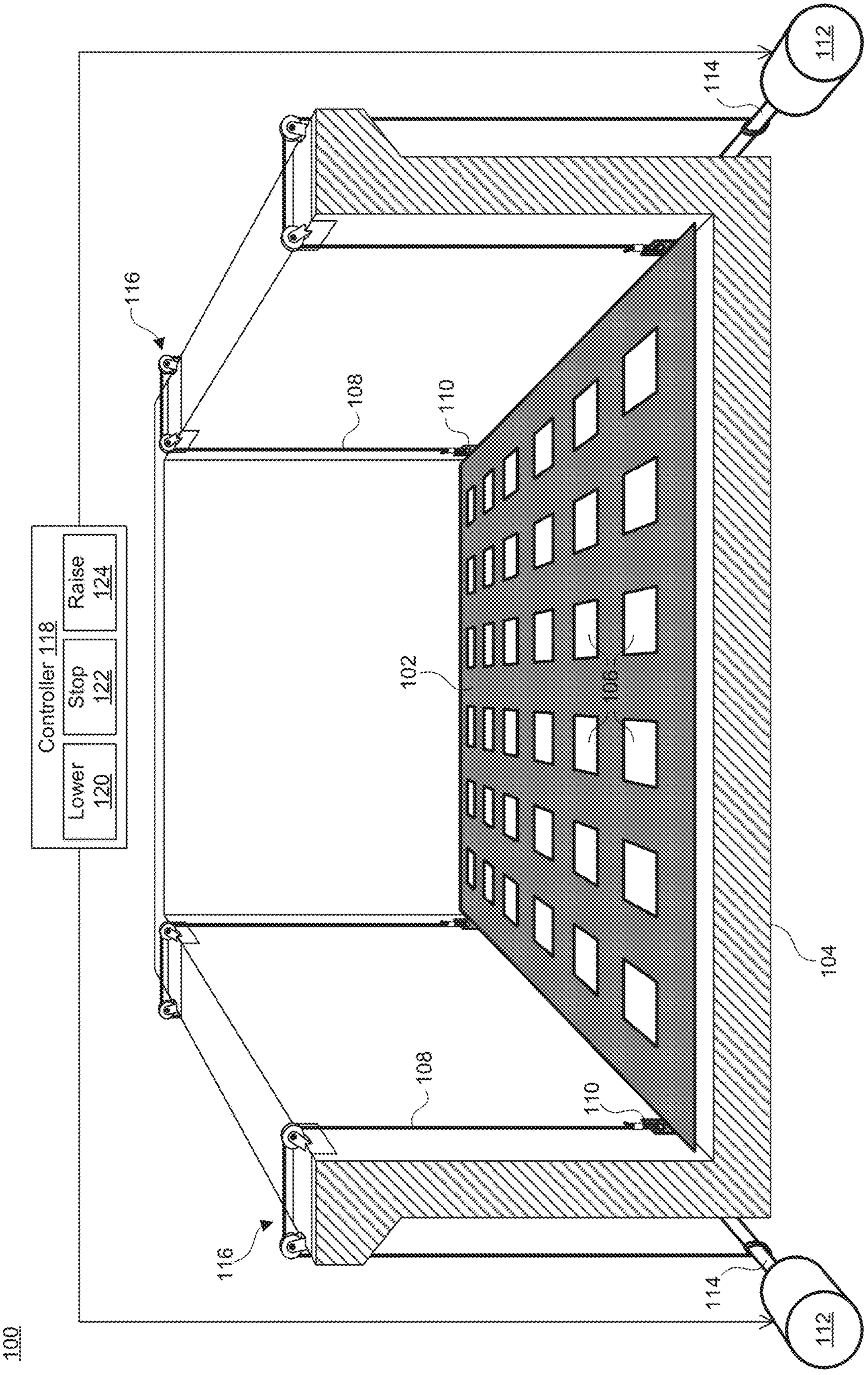
FIG. 1 shows a pool protection system, in accordance with an embodiment of the present disclosure.

Referring to FIG. 1, there is shown a pool protection system 100, in accordance with an embodiment of the present disclosure. The pool protection system 100 may include a platform 102 fitted into a pool 104. For purposes of illustration, FIG. 1 shows a view of the pool 104 with one of its walls cut out. The platform 102 may be shaped to fit within the walls of the pool 104, with adequate clearance (e.g., a few inches) on the sides to move up and down the pool 104. The platform 102 may be oriented substantially parallel to the surface of water (not shown) in the pool 104. It is to be appreciated that, while the platform 102 is illustrated to be rectangular and fitting within the rectangular pool 104, the platform 102 may be shaped to match the shape of any pool.

The platform 102 may include a plurality of openings 106. The plurality of openings 106 may allow through water in the pool 104, thereby decreasing the pressure or force that the water exerts on the platform 102 when the platform 102 moves up or down the pool 104. As such, the plurality of openings 106 may facilitate or speed up the movement of the platform 102 up and down the pool 104. It may be desirable that each of the plurality of openings 106 be as big as possible. In some embodiments, the size of the plurality of openings 106 may be limited to prevent a risk of a user of the pool 104 getting tangled or trapped at the bottom of the pool 104. In other embodiments, the size of the plurality of openings 106 may be maximized with the plurality of openings 106 covered or fitted with a mesh to prevent a risk of a user of the pool 104 getting tangled or trapped at the bottom of the pool 104. In yet other embodiments, the whole platform 102 may be in the form of a mesh. In FIG. 1, the plurality of openings 106 are illustrated as, but are not limited to, square or rectangular openings. For example, the plurality of openings 106 may be circular, oval, or any other shapes, and achieve the same functionality.

When not in operation or when in standby mode, the platform 102 may be held in suspension in proximity of the floor of the pool 104 by means of a plurality of cables 108. Alternatively, when not in operation or when in standby mode, the platform 102 may rest on the floor of the pool 104. The platform 102 may include, around or close to its perimeter, a plurality of attachment portions 110 to each of which an end of one of the plurality of cables 108 may be attached. In an embodiment, each of the plurality of attachment portions 110 may be in the form of a flange with a hole through which an end of a cable 108 may be attached (e.g., crimped), as illustrated in FIG. 1. While four cables 108 and four attachment portions 110 are illustrated in FIG. 1, it is to be understood that more or fewer cables 108 and attachment portions 110 may be needed depending on the size and weight of the platform 102. In another embodiment, for example, the platform 102 may include, around or close to its perimeter, a plurality of holes through which the plurality of cables 108 may be attached. It is to be appreciated that there exist numerous ways of attaching the plurality of cables 108 to the platform 102.

In an embodiment, the other end of each of the plurality of cables 108 may be attached or connected to a plurality of motors 112. For example, the other end of the each of the plurality of cables 108 may be attached or connected to the shafts 114 of the plurality of motors 112. For example, as illustrated in FIG. 1, the pool protection system 100 may include two motors 112, whereby two cables 108 are attached or connected to the shaft 114 of each of the two motors 112. In some embodiments, the pool protection system 100 may include a motor for each of the plurality of cables 108. In the embodiment of FIG. 1, the plurality of motors 112 may be installed below ground level, for example, in one or more underground mechanical room(s). Such an arrangement may be well suited for newly built pools. The plurality of motors 112 may be electric motors. The size and power and torque ratings of each of the plurality of motors 112 may depend on the number of cables 108 attached or connected to its shaft 114, the size and weight of the platform 102, and the weight of the heaviest person expected to be supported and raised by the platform 102.

The pool protection system 100 may further include a plurality of pulley systems 116. The plurality of pulley systems 116 may be installed or mounted on the edges or rims of the pool 104, as shown in FIG. 1. Each of the plurality of pulley systems 116 may include a plurality of pulleys. For example, each of the plurality of pulley systems 116 may include two pulleys. In other embodiments, each of the plurality of pulley systems 116 may include one pulley or more than two pulleys. The pulleys in each of the plurality of pulley systems 116 may support one of the plurality of cables 108 and rotate as the cable 108 is wound or unwound around the shaft 114 to move the platform 102 up and down the pool 104, respectively. The plurality of pulley systems 116 may prevent the plurality of cables 108 from being in contact with the edges or rims of the pool 104 and wearing out. In some embodiments, each of the plurality of pulley systems 116 may be covered by or housed in an enclosure, for example, to protect the pulleys from the elements, for the safety of users of the pool 104, and for aesthetics. Similarly, in some embodiments, exposed portions of the plurality of cables 108 may be covered by or housed in an enclosure.

The pool protection system 100 may include a controller 118. The controller 118 may be in wired or wireless communication with the plurality of motors 112. The controller 118 may allow a user to activate or deactivate the plurality of motors 112. For example, the controller 118 may provide a first mode 120, a second mode 122, and a third mode 124 to the user. When the first mode 120 is selected by the user, the controller 118 may be configured to activate the plurality of motors 112 collectively and synchronously to lower the platform 102 into the pool 104. When the second mode 122 is selected by the user, the controller 118 may be configured to stop or deactivate the plurality of motors 112 at a desired depth of the pool 104. When the third mode 124 is selected by the user, the controller 118 may be configured to activate the plurality of motors 112 collectively and synchronously to raise the platform 102. The controller 118 may also be configured to automatically deactivate the plurality of motors 112 when the platform 102 reaches a highest predetermined point or a lowest predetermined point of the pool 104.

In an embodiment, the controller 118 may be an interface or a box with a switch or button (e.g., a push button) for each of the modes 120, 122, and 124. In another embodiment, the controller 118 may be an electronic touch-sensitive user interface with a user interface element for each of the modes 120, 122, and 124. In yet another embodiment, the controller 118 may be a three-way toggle switch or lever with three positions corresponding to the modes 120, 122, and 124. The controller 118 may be installed in the neighborhood of the pool 104 and readily accessible by a user such that the plurality of motors 112 may be promptly activated to raise the platform 102 in the event of a potential drowning. The controller 118 may further include a protective measure or mechanism to prevent accidental or unintended activation of the plurality of motors 112. For example, the controller 118 may include a cover that may need to be unlocked, disengaged, lifted, or broken before one of the modes 120, 122, and 124 may be selected.

The platform 102 may be made of a corrosion-resistant material that has a density greater than the density of water such that the platform 102 may sink to the bottom of the pool 104. At the same time, the material for the platform 102 must be sturdy enough to carry the heaviest person expected to use the pool 104, while keeping the weight of the platform 102 as low as possible such that the size and power and torque ratings of the plurality of motors 112 may be minimized. In some embodiments, the platform 102 may be rigid. For example, the platform 102 may be made of, but is not limited to, aluminum, stainless steel, or polyethylene terephthalate In other embodiments, the platform 102 may be flexible or in form of a net. In yet other embodiments, the platform 102 may be a combination of rigid and flexible materials. For example, the platform 102 may comprise a mesh material surrounded by rigid, such as steel bar, edges.

The plurality of cables 108 may be made of a corrosion-resistant material capable to hoist the platform 102 up the pool 104 when filled up with water and when the heaviest person expected to use the pool 104 is lying on the platform 102. For example, the plurality of cables 108 may be stainless steel cables or ultraviolet-resistant braided nylon ropes. The size (i.e., diameter) of such cables may depend on the weight of the platform 102 and the heaviest person expected to use the pool 104. In other words, the size of such cables may depend on the maximum tension that may be expected to be exerted on the cables. In other embodiments, in lieu of the plurality of cables 108, other mechanisms—for example, metal link chains (similar to a bicycle chain)—may be used to raise and lower the platform 102 in the pool 104.

Figure 2:
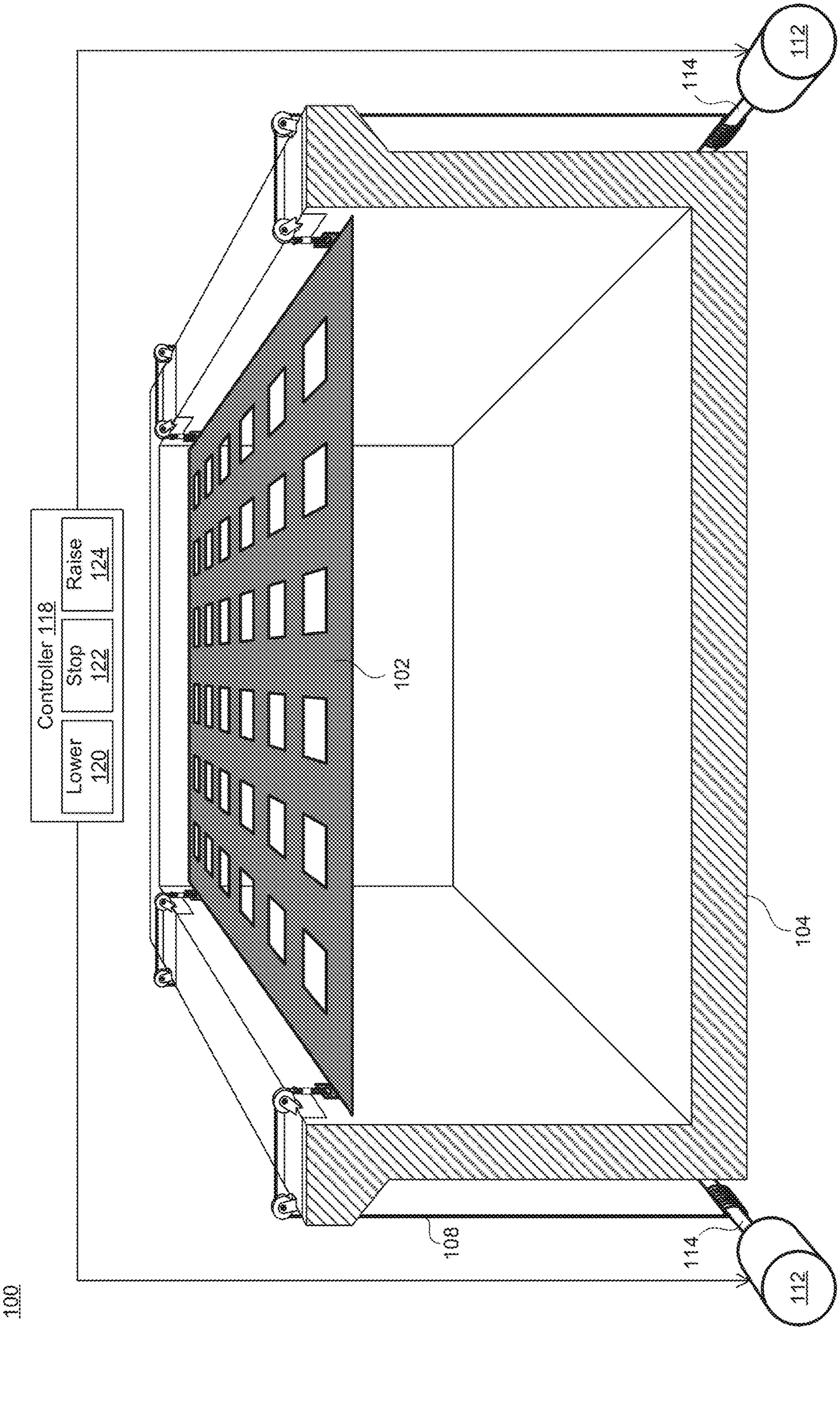
FIG. 2 shows a configuration of the pool protection system of FIG. 1, in accordance with an embodiment of the present disclosure.

FIG. 2 illustrates the pool protection system 100 with the platform 102 raised, in accordance with an embodiment of the present disclosure. For example, the platform 102 may have been raised after a user selected the third mode 124 of the controller 118, activating the plurality of motors 112 and rotating their shafts 114 to wind up the plurality of cables 108. The user may have stopped the platform at a desired height by selecting the second mode 122 of the controller 118, or the controller 118 may have automatically stopped the platform 102 at the highest predetermined point of the pool 104. In the configuration shown in FIG. 2, a person (not shown) in the pool 104 would have been raised outside of the water of the pool 104 by the platform 102. The person may either step off the platform 102 and outside of the pool 104 or, if in distress, be relatively easily assisted by other person(s) around the pool 104. Alternatively, the pool protection system 100 may be used to help elderly or incapacitated people to get in and out of the pool 104.

Figure 3:
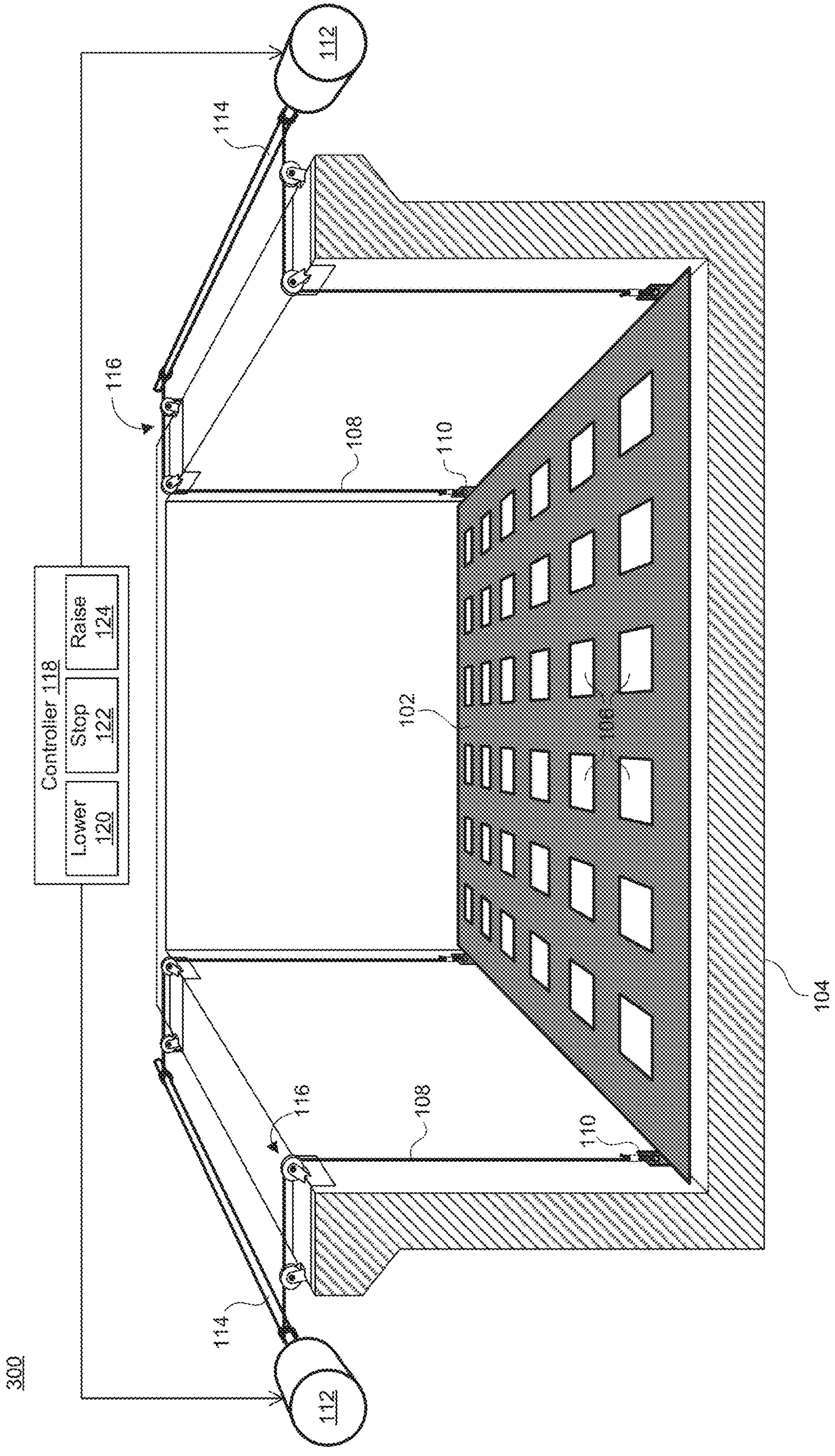
FIG. 3 shows a pool protection system, in accordance with an embodiment of the present disclosure.

FIG. 3 illustrates the pool protection system 300, in accordance with an embodiment of the present disclosure. The pool protection system 300 may include the same elements as the pool protection system 100, except that, in pool protection system 300, the plurality of motors 112 and their corresponding shafts 114 may be installed above ground level. For example, the plurality of motors 112 and their corresponding shafts 114 may be installed in the vicinity and around the perimeter of the pool 104. Such arrangement may be well suited for existing pools that may be retrofitted with the pool protection system 300.

Figure 4:
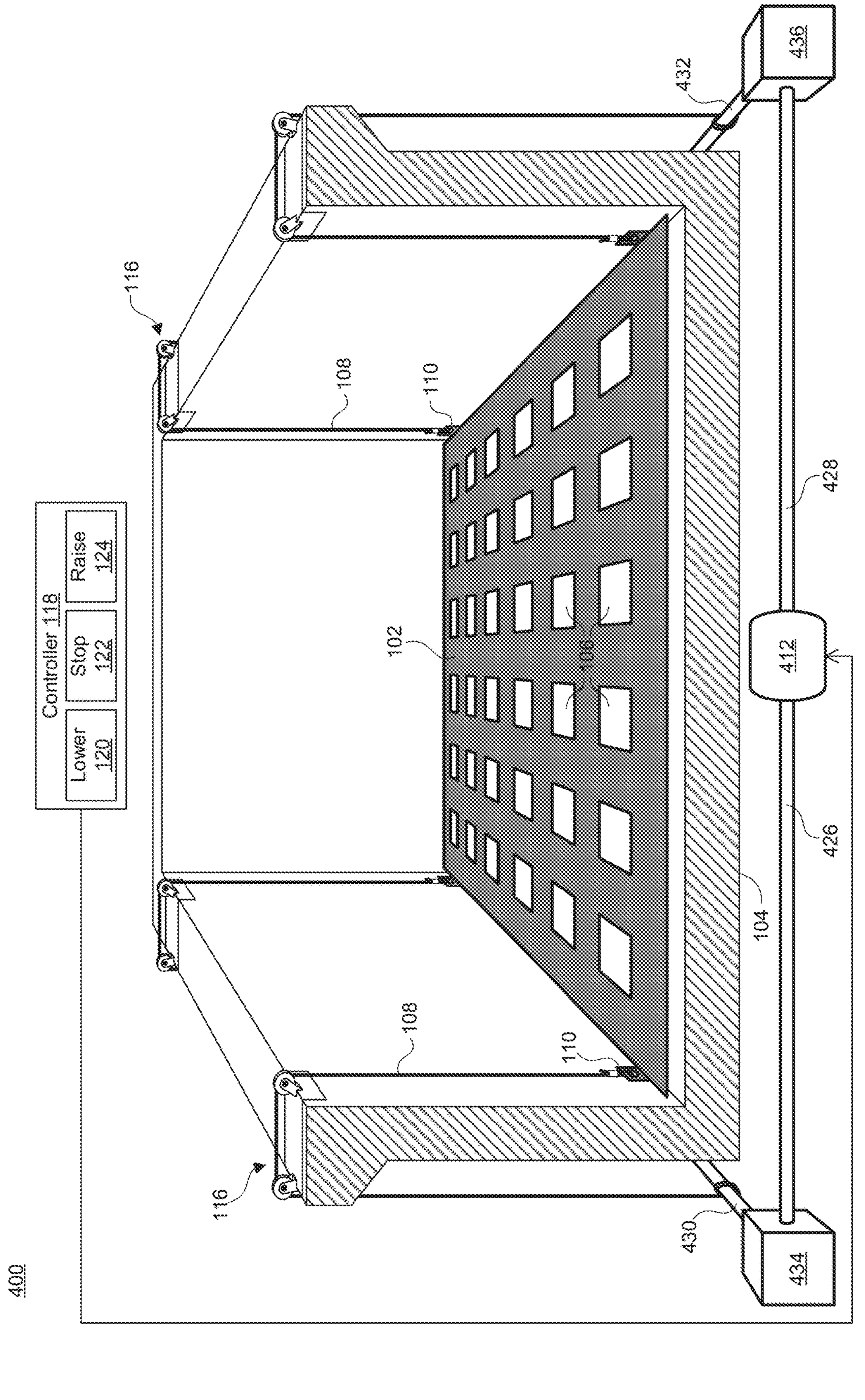
FIG. 4 shows a pool protection system, in accordance with an embodiment of the present disclosure.

Referring to FIG. 4, there is shown a pool protection system 400, in accordance with an embodiment of the present disclosure. The pool protection system 400 may include the same elements as the pool protection system 100, except that the pool protection system 400 may include a single motor 412. The motor 412 may include a first shaft 426 and a second shaft 428. Alternatively, the first shaft 426 and the second shaft 428 may comprise a single shaft that goes through the motor 412. The rotational motion of the first shaft 426 and the second shaft 428 may be transferred respectively to shafts 430 and 432 via gearboxes 434 and 436. The plurality of cables 108 may attached or connected to shaft 430 or 432. When the motor 412 is activated (e.g., by selecting mode 120 or 124 of controller 118), the first shaft 426 and the second shaft 428 may rotate synchronously, and their rotational motions may be transferred respectively to shafts 430 and 432 via gearboxes 434 and 436, thereby winding or unwinding the plurality of cables 108 to respectively raise or lower the platform 102. The motor 412, shaft 426, 428, 430, and 432, and gearboxes 434 and 436 may be installed below ground level, for example, in an underground mechanical room. Such an arrangement may be well suited for newly built pools. Alternatively, motor 412, shaft 426, 428, 430, and 432, and gearboxes 434 and 436 may be installed above ground. Such an arrangement may be better suited for existing pools that may be retrofitted with a pool protection system.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. As an example, instead of using cables and pulley systems, the platform may be raised or lowered from underneath by one or more hydraulic or pneumatic pistons onto which the platform may be mounted. The one or more pistons may be operated by one or more motors, which may be controlled by a controller similar to controller 118 described above. As another example, the pool protection systems may be modified or adapted to operate along with other known pool systems such as pool cleaners, pool covers, etc. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. For example, in addition to lifting a person, the platform may more generally be used to lift objects on the floor of the pool, such as pool toys, equipment, debris, etc. Accordingly, the claims set forth below should be construed in view of the full breadth and spirit of the present disclosure as described herein.

The invention claimed is:

1. A pool protection system comprising:

a platform fitted in a pool, oriented parallel to a surface of water in the pool, and configured to move vertically in the pool;

one or more motors mechanically connected to the platform; and a controller in communication with the one or more motors, wherein the controller includes a first button that, when activated by a user, causes the controller to activate the one or more motors to continuously lower the platform in the pool, the controller includes a second button that, when activated by the user, causes the controller to activate the one or more motors to continuously raise the platform in the pool, the controller includes a third button that, when activated by the user, causes the controller to deactivate the one or more motors such that the platform stops at a depth desired by the user, when the user does not activate the third button after activating the first button, the controller is configured to automatically deactivate the one or more motors when the platform reaches the lowest point of the pool, and when the user does not activate the third button after activating the second button, the controller is configured to automatically deactivate the one or more motors when the platform reaches the highest point of the pool.

2. The pool protection system of claim 1, wherein the controller is an electronic touch-sensitive user interface with three user interface elements corresponding to the first button, the second button, and the third button.

3. The pool protection system of claim 1, wherein the controller includes a protective mechanism to prevent unintended activation of at least one of the first button, the second button, and the third button.

4. The pool protection system of claim 1, further comprising a plurality of cables, wherein one end of each of the plurality of cables is attached to the platform and at least one another end of each of the plurality of cables is attached to a shaft of one of the one or more motors.

5. The pool protection system of claim 4, wherein the pool protection system includes one motor for each of the plurality of cables.

6. The pool protection system of claim 4, wherein the plurality of cables are made of stainless steel or braided nylon.

7. The pool protection system of claim 4, further comprising a plurality of pulley systems to support the plurality of cables between the platform and the one or more motors.

8. The pool protection system of claim 7, wherein each of the plurality of pulley systems includes one or more pulleys to support the plurality of cables.

9. The pool protection system of claim 1, wherein the pool protection system comprises one motor.

10. The pool protection system of claim 9, wherein a rotational motion of the one motor is transferred around the pool via a plurality of shafts and a plurality of gearboxes.

11. The pool protection system of claim 1, wherein the platform includes a plurality of openings.

12. The pool protection system of claim 1, wherein the platform is made of a material that is denser than water.

13. The pool protection system of claim 1, wherein the platform is made of aluminum, stainless steel, or polyethylene terephthalate.

14. The pool protection system of claim 1, wherein the one or more motors are electric motors.

15. The pool protection system of claim 3, wherein the protective mechanism is a cover that needs to be unlocked, disengaged, lifted, or broken to allow access to the first button, the second button, and the third button.

* * * * *